United States Patent
Hirata et al.

(10) Patent No.: US 8,485,241 B2
(45) Date of Patent: Jul. 16, 2013

(54) SYSTEM AND METHOD FOR CONTINUOUSLY MANUFACTURING LIQUID CRYSTAL DISPLAY DEVICE

(75) Inventors: Satoshi Hirata, Ibaraki (JP); Seiji Kondo, Ibaraki (JP); Kazuya Hada, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 0 days.

(21) Appl. No.: 13/271,665

(22) Filed: Oct. 12, 2011

(65) Prior Publication Data

US 2012/0125531 A1    May 24, 2012

(30) Foreign Application Priority Data

Nov. 22, 2010    (JP) .................................. 2010-260464

(51) Int. Cl.
*B65H 37/04*    (2006.01)

(52) U.S. Cl.
USPC ............ 156/540; 156/249; 156/766; 156/367

(58) Field of Classification Search
USPC ................. 156/230, 367, 766, 767, 350, 358, 156/715, 540, 249
See application file for complete search history.

(56) References Cited

U.S. PATENT DOCUMENTS

| | | |
|---|---|---|
| 2007/0204961 A1 | 9/2007 | Nakashima et al. |
| 2010/0326589 A1 | 12/2010 | Koshio et al. |

FOREIGN PATENT DOCUMENTS

| | | | |
|---|---|---|---|
| JP | 8-022012 A | | 1/1996 |
| JP | 10-151717 | * | 6/1998 |
| JP | 10-151717 A | | 6/1998 |
| JP | 2004-361741 | * | 12/2004 |
| JP | 2004-361741 A | | 12/2004 |
| JP | 2005-306604 A | | 11/2005 |
| JP | 2006-007621 A | | 1/2006 |
| JP | 2009-271521 A | | 11/2009 |

OTHER PUBLICATIONS

Japanese Office Action dated Dec. 6, 2011, issued in corresponding Japanese Patent Application No. 2010-260464.(w/partial English translation).
Japanese Office Action, dated Aug. 9, 2011, application No. 2010-260464.

* cited by examiner

*Primary Examiner* — Katarzyna Wyrozebski Lee
*Assistant Examiner* — Vishal I Patel
(74) *Attorney, Agent, or Firm* — Westerman, Hattori, Daniels & Adrian, LLP (57) ABSTRACT

A system for manufacturing a liquid crystal display device, includes peeling means that peels off a sheet piece of the polarizing film from a carrier film; take-up means that takes up the carrier film; bonding means that bonds the sheet piece to a panel; and velocity control means for controlling a feed velocity of the take-up means and a feed velocity of the bonding means in such a manner that: Vh(t)>Vs(t) during a period from the start of the process of bonding the sheet piece to the end of the bonding and that slack formed in the sheet piece being subjected to the bonding is eliminated between a front end of the peeling means and a position in which the bonding is performed by the bonding means; and that during a period from the start of the bonding process to the end of the bonding, L>Ls.

4 Claims, 6 Drawing Sheets

FIG.6A (a) Example 1 (Vh(t)>Vs(t), 0≤t≤T)

FIG.6B (b) Comparative Example 1 (Vh(t)>Vs(t), 0≤t≤T)

FIG.6C (c) Comparative Example 2
(Vh(t)>Vs(t), 0<t<T; Vh(t)≤Vs(t) where
0<t<T is not satisfied)

FIG.6D (d) Comparative Example 3 (Vh(t)=Vs(t), 0≤t≤T)

FIG.6E (e) Comparative Example 4 (Vh(t)<Vs(t), 0≤t≤T)

FIG.6F (f) Comparative Example 5
(Vh(t)>Vs(t), 0<t<T; Vh(t)=Vs(t)
where 0<t<T is not satisfied)

FIG.7

SYSTEM AND METHOD FOR CONTINUOUSLY MANUFACTURING LIQUID CRYSTAL DISPLAY DEVICE

BACKGROUND OF THE INVENTION

1. Field of the Invention

The invention relates to a system and a method for continuously manufacturing a liquid crystal display device by a process that includes peeling off a sheet piece of polarizing film from a carrier film and boding the sheet piece to a liquid crystal panel with a pressure-sensitive adhesive interposed therebetween to form a liquid crystal display device.

2. Description of the Related Art

There is a known method that includes providing a carrier film on which sheet pieces of polarizing film are formed with a pressure-sensitive adhesive interposed therebetween, inwardly folding back the carrier film at the front end of the peeling means to peel off a sheet piece of the polarizing film together with the pressure-sensitive adhesive from the carrier film, and bonding the sheet piece of the polarizing film, which has been peeled off, to a liquid crystal panel with the pressure-sensitive adhesive interposed therebetween (Japanese Patent Application Laid-Open (JP-A) No. 2004-361741).

Patent Document 1: Japanese Patent Application Laid-Open (JP-A) No. 2004-361741.

Figure 7:
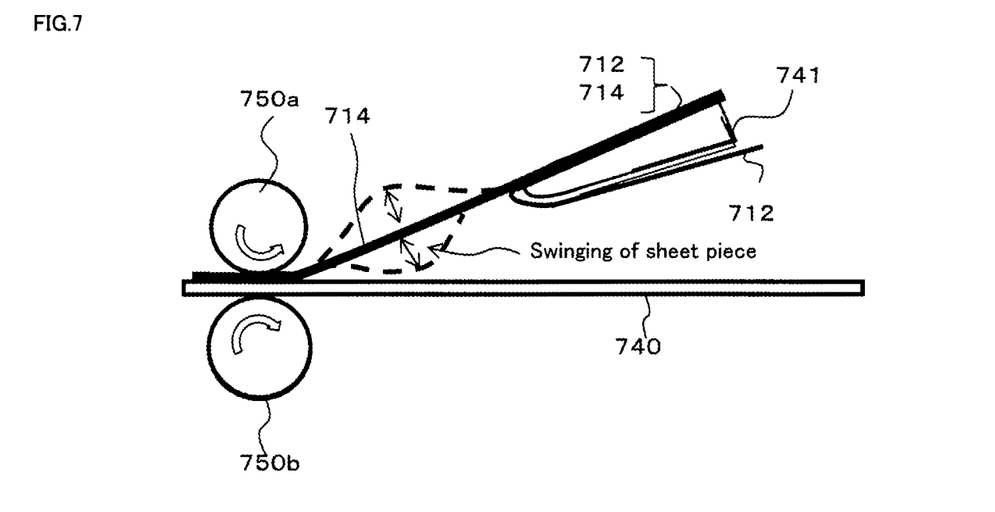
FIG. 7 is a diagram showing an example where a sheet piece of polarizing film is swinging when it is bonded by conventional bonding means.

As shown in FIG. 7, there is a method that includes nipping a sheet piece 714 of polarizing film and a liquid crystal panel 740 between a pair of bonding means (750a, 750b), while peeling off a carrier film 712 by inwardly folding back the carrier film 712 using peeling means 741, so that the sheet piece 714 is bonded to the liquid crystal panel 740. In the case of this method, however, for example, the sheet piece 714 swings during the bonding, so that bubbles are formed in the liquid crystal panel 740 after the bonding, which becomes a cause of image display failure, and therefore, there has been a demand for improvement of this method.

SUMMARY OF THE INVENTION

The invention has been made in view of the above circumstances, and an object of the invention is to provide a system and a method for continuously manufacturing a liquid crystal display device, which make it possible to suppress swinging of a sheet piece of polarizing film being bonded so that the occurrence of bubbles can be prevented in the bonding.

As a result of earnest studies to solve the above problems, the invention described below has been accomplished.

The invention is directed to a system for continuously manufacturing a liquid crystal display device, includes:

carrier film feeding means for feeding a carrier film on which sheet pieces of polarizing film are formed with a pressure-sensitive adhesive interposed therebetween;

peeling means for peeling off a sheet piece of the polarizing film together with the pressure-sensitive adhesive from the carrier film by inwardly folding back the carrier film at its front end, wherein the carrier film is fed by the carrier film feeding means;

take-up means for taking up the carrier film from which the sheet piece is peeled off by the peeling means;

bonding means for bonding the sheet piece, which is peeled off from the carrier film by the peeling means, to a liquid crystal panel with the pressure-sensitive adhesive interposed therebetween while feeding the liquid crystal panel so that a liquid crystal display device is formed; and velocity control means for controlling a feed velocity of the take-up means and a feed velocity of the bonding means in such a manner that:

a bonding velocity ($Vh(t)$) in the bonding process and a carrier film feed velocity ($Vs(t)$) at which the carrier film is peeled off by the peeling means are set so that the bonding velocity ($Vh(t)$) is higher than the carrier film feed velocity ($Vs(t)$) ($Vh(t)>Vs(t)$) during a period from the start of the process of bonding the sheet piece by the bonding means to the end of the bonding and that slack formed in the sheet piece being subjected to the bonding is eliminated between a front end of the peeling means and a position in which the bonding is performed by the bonding means; and that during a period from the start of the bonding process to the end of the bonding, the distance ($L$) between the front end of the peeling means and the position in which the bonding is performed by the bonding means is longer than the distance ($Ls$) between the front end of the peeling means and a bent part at which the carrier film is folded back.

According to this feature, slack can be eliminated from the sheet piece of polarizing film peeled off from the carrier film, so that swinging of the sheet piece can be suppressed during the bonding and that the occurrence of bubbles can be prevented in the bonding.

The invention is directed to a method for continuously manufacturing a liquid crystal display device, includes:

a carrier film feeding step comprising feeding a carrier film on which sheet pieces of polarizing film are formed with a pressure-sensitive adhesive interposed therebetween;

a peeling step comprising peeling off a sheet piece of the polarizing film together with the pressure-sensitive adhesive from the carrier film by inwardly folding back the carrier film at a front end, wherein the carrier film is fed by the carrier film feeding step;

a take-up step comprising taking up the carrier film from which the sheet piece is peeled off by the peeling step;

a bonding step comprising bonding the sheet piece, which is peeled off from the carrier film by the peeling step, to a liquid crystal panel with the pressure-sensitive adhesive interposed therebetween while feeding the liquid crystal panel so that a liquid crystal display device is formed; and a velocity control step comprising controlling a bonding velocity ($Vh(t)$) in the bonding process and a carrier film feed velocity ($Vs(t)$) at which the carrier film is peeled off in the peeling step in such a manner that: the bonding velocity ($Vh(t)$) and the carrier film feed velocity ($Vs(t)$) are set so that the bonding velocity ($Vh(t)$) is higher than the carrier film feed velocity ($Vs(t)$) ($Vh(t)>Vs(t)$) during a period from the start of the process of bonding the sheet piece to the end of the bonding and that slack formed in the sheet piece is eliminated between the bonding position and a front end of the peeling means; and that during a period from the start of the bonding process to the end of the bonding, the distance ($L$) between the bonding position and the front end of the peeling means is longer than the distance ($Ls$) between the front end of the peeling means and a bent part at which the carrier film is folded back.

According to this feature, slack can be eliminated from the sheet piece of polarizing film peeled off from the carrier film, so that swinging of the sheet piece can be suppressed during the bonding and that the occurrence of bubbles can be prevented in the bonding.

Figure 1A:
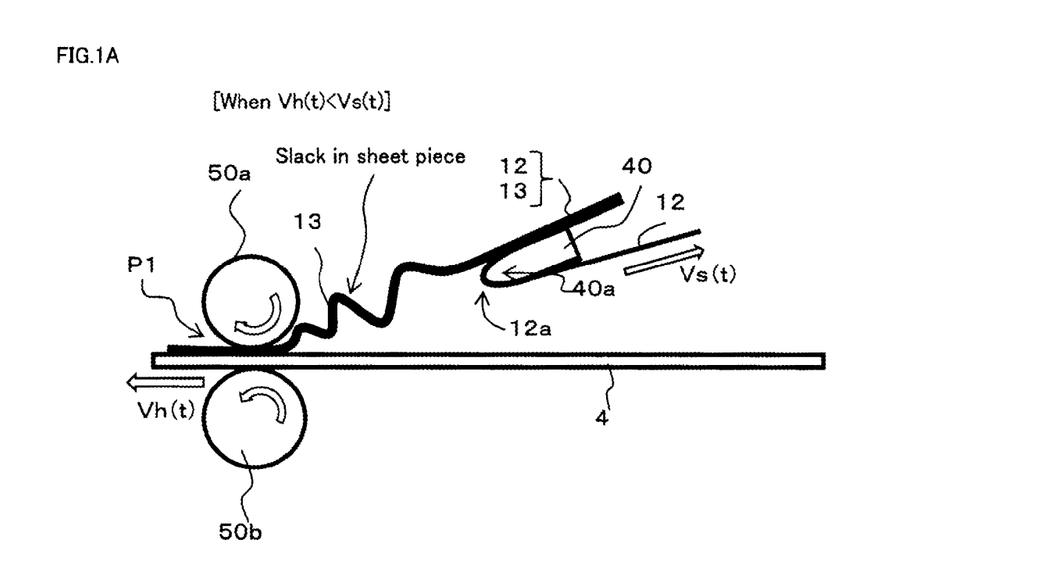
FIG. 1A is a diagram for illustrating slack in a sheet piece of polarizing film being bonded.
Figure 1B:
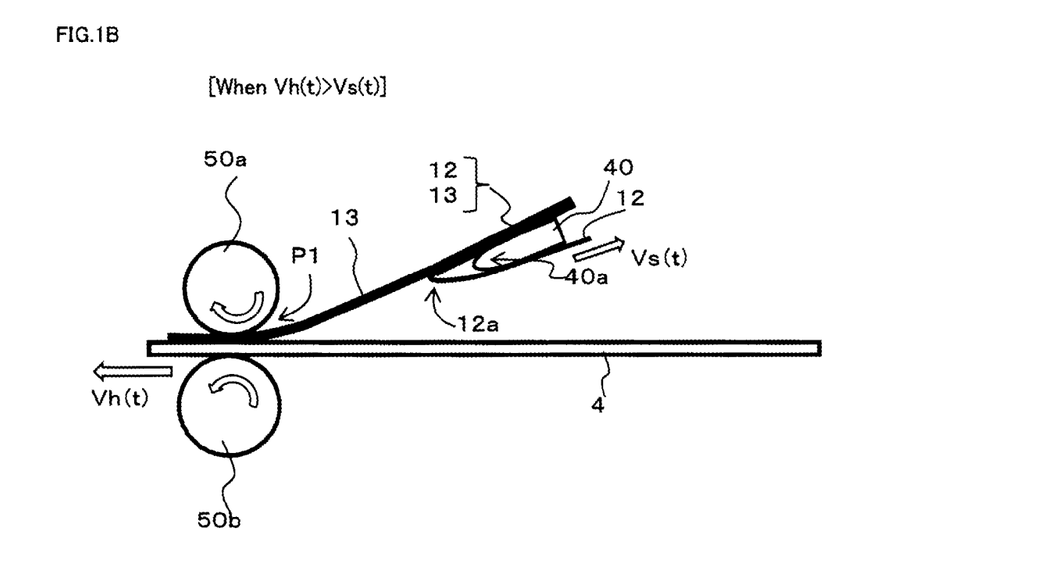
FIG. 1B is a diagram for illustrating slack in a carrier film during bonding.

It is considered that the system and the method of the invention for continuously manufacturing a liquid crystal display device work as described below. When the front end of a sheet piece of polarizing film is fed to the bonding unit of bonding means, the front end of the sheet piece is peeled off from a carrier film, so that the front end of the sheet piece becomes unstable and tends to slack, and slack is easily formed immediately after the start of the bonding. When the slack is formed, the sheet piece can easily swing during the bonding, which becomes a cause of the occurrence of bubbles in the bonding. Also, even when there is no slack, a higher carrier film feed velocity (the take-up velocity of take-up means) than the bonding velocity may cause slack, and therefore, this possibility should be avoided. FIGS. 1A and 1B show a mechanism for the occurrence of slack in cases where there is a difference between the bonding velocity and the carrier film feed velocity. FIG. 1A shows a case where the feed velocity Vs(t) of a carrier film 12 is higher than the bonding velocity Vh(t), in which a sheet piece 13 of polarizing film tends to slack and swing between the bonding position P1 and the front end 40a of peeling means 40. In FIG. 1A, a bent part 12a at which the carrier film 12 is folded back is formed along the periphery of the front end 40a of the peeling means 40. On the other hand, FIG. 1B shows a case where the bonding velocity Vh(t) is higher than the carrier film feed velocity Vs(t), in which a bent part 12a at which the carrier film 12 is folded back is formed to protrude from the front end 40a of the peeling means 40 so that the carrier film 12 is separated from the peeling means 40. In this case, the sheet piece 13 can be bonded with no slack or swinging.

In an embodiment of the invention, the velocity control means controls the carrier film feed velocity (the take-up velocity of the take-up means) and the feed velocity of the bonding means, respectively, in such a manner that: the bonding velocity (Vh(t)) is higher than the carrier film feed velocity (Vs(t)) so that slack formed at the initial stage of the bonding can be eliminated; and that the bonding velocity (Vh(t)) and the carrier film feed velocity (Vs(t)) are set so that slack formed in the sheet piece can be eliminated between the front end of the peeling means and the position where the bonding is performed by the bonding means, which makes it possible to avoid the possibility of the occurrence of slack during the bonding.

In an embodiment of the invention, the condition: "the bonding velocity (Vh(t)) in the bonding process and the carrier film feed velocity (Vs(t)) at which the carrier film is peeled off by the peeling step are set so that the bonding velocity (Vh(t)) is higher than the carrier film feed velocity (Vs(t)) (Vh(t)>Vs(t)) during a period from the start of the bonding process to the end of the bonding and that slack formed in the sheet piece is eliminated between the bonding position and the front end of the peeling means" may be represented by conditional expression (1) below.

<Conditional Expression 1>

$$\int_0^t Vh(t)dt - \int_0^t Vs(t)dt = Lf - L \quad (1)$$

provided that t satisfying conditional expression (1) falls within the range 0<t<T.

In conditional expression (1), L represents the distance [mm] in a straight line between the bonding position P1 and the front end 40a of the peeling means 40, t represents time [second], Vh(t) represents the bonding velocity [mm/second], Vs(t) represents the carrier film feed velocity [mm/second], and T represents the bonding time (period) [second]. Lf represents the actual length of a sheet piece of polarizing film between the bonding position P1 and the front end 40a of the peeling means 40. The length Lf can be calculated through the analysis of the image taken with a video.

Figure 2A:
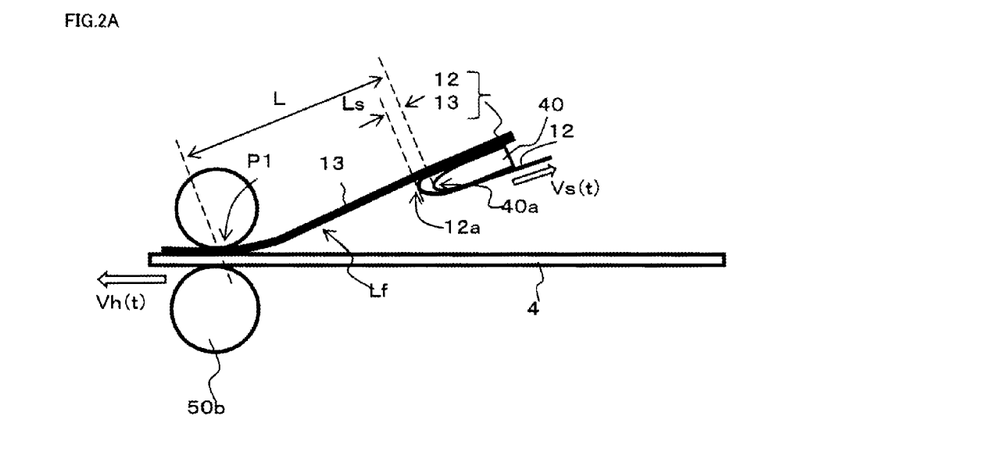
FIG. 2A is a diagram for illustrating conditional expressions (1) and (2)
Figure 2B:
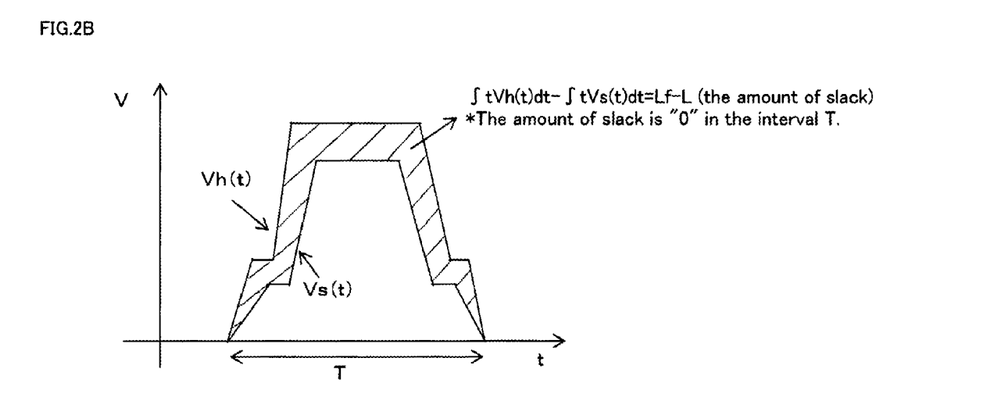
FIG. 2B is a diagram for illustrating conditional expression (1)

FIG. 2A is a diagram for illustrating conditional expression (1). The left-hand side of conditional expression (1) represents the amount of slack eliminated by the velocity difference between the bonding velocity Vh(t) and the carrier film feed velocity Vs(t). The right-hand side of conditional expression (1) represents the amount of actual slack in a sheet piece of polarizing film. It is necessary to eliminate slack during a period from the start of the bonding to the end of the bonding, and therefore, t satisfying conditional expression (1) has to fall within the range 0<t<T. For example, t/T is preferably 0.3 or less, wherein T represents the time (period) from the start of the bonding to the end of the bonding, and t represents a time at which slack is eliminated. The value t/T, which should be 0.3 or less, may be obtained by a process that includes performing the bonding process twice or more, while measuring the time (t) at which slack is eliminated from the sheet piece of polarizing film during the period T, and averaging the measurements.

As the rigidity against bending (bending rigidity) of the optical film decreases, the sheet piece of polarizing film becomes more likely to slack, and bubbles become more likely to occur in the boding of the sheet piece to the liquid crystal panel. In particular, the invention is preferably applied to a polarizing film having a bending rigidity per unit width of 5 N·mm²/mm or less. The bending rigidity per unit width (E×I) represents a degree of resistance to bending of the material. E represents the modulus [N/mm²] of longitudinal elasticity of the polarizing film, I represents the second moment of area per unit width, and I=bxh³/12, wherein b represents the unit width [1 mm], and h represents the thickness [mm] of the polarizing film.

As shown in FIG. 2A, the velocity control means according to the invention further controls the feed velocity of the take-up means and the feed velocity of the bonding means, respectively, in such a manner that the distance (L) between the front end 40a of the peeling means 40 and the position P1 in which the bonding is performed by the bonding means (50a, 50b) is longer than the distance (Ls) between the front end 40a of the peeling means 40 and a bent part 12a at which the carrier film 12 is folded back, so that the bent part 12a of the carrier film 12 is prevented from being entangled with the bonding means (50a, 50b).

In an embodiment of the invention, the condition: "the distance (L) between the front end of the peeling means and the position in which the bonding is performed by the bonding means is longer than the distance (Ls) between the front end of the peeling means and a bent part at which the carrier film is folded back" may be represented by conditional expression (2) below.

<Conditional Expression 2>

$$2 \times L > \int_0^T [Vh(t) - Vs(t)]dt \quad (2)$$

In conditional expression (2), L represents the distance (mm) in a straight line between the bonding position P1 and the front end 40a of the peeling means 40, t represents time [second], Vh(t) represents the bonding velocity [mm/second], Vs(t) represents the carrier film feed velocity [mm/second], and T represents the bonding time (period) [second].

When conditional expression (2) is satisfied, the carrier film separating from the peeling means under the condition Vh(t)>Vs(t) can be prevented from being entangled with the bonding means.

When conditional expressions (1) and (2) are satisfied as described above, the sheet piece of polarizing film can be suppressed from slackening or swinging during the bonding, and the carrier film can be prevented from being entangled with the bonding means.

DETAILED DESCRIPTION OF THE PREFERRED EMBODIMENTS (Polarizing Film and Continuous Roll)

In an embodiment of the invention, the polarizing film may be formed on the carrier film in any mode. For example, they may be wound to form a continuous roll. For example, the continuous roll may be (1) a roll of an optical film laminate including a carrier film and a polarizing film formed on the carrier film with a pressure-sensitive adhesive interposed therebetween. In this case, the system for continuously manufacturing a liquid crystal display device has cutting means for cutting the polarizing film into sheet pieces of the polarizing film in such a manner that the polarizing film and the pressure-sensitive adhesive are cut at predetermined intervals, while the carrier film is left uncut (cutting means for performing half-cutting). For example, the cutting may be performed in such a manner as to classify non-defective and defective sheet pieces based on the result of an inspection performed using a defect inspection apparatus in the continuous manufacturing system.

Alternatively, for example, the continuous roll may be (2) a roll of an optical film laminate including a carrier film and sheet pieces of polarizing film formed on the carrier film with a pressure-sensitive adhesive interposed therebetween (a continuous roll of a so-called scored polarizing film).

Figure 3:
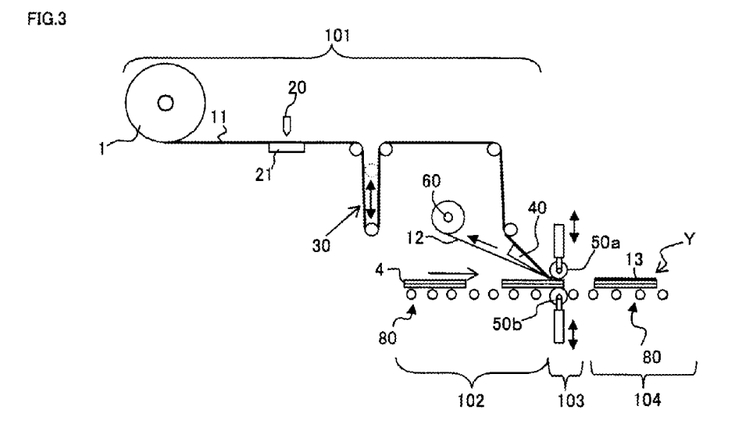
FIG. 3 is a schematic diagram showing an example of the system for continuously manufacturing a liquid crystal display device.

For example, the first continuous roll 1 shown in FIG. 3 is a roll of a first optical film laminate 11 including a first carrier film 12 and a first polarizing film 13 formed on the first carrier film 12 with a first pressure-sensitive adhesive interposed therebetween.

For example, the polarizing film includes a polarizer (about 1.5 to about 80 μm in thickness) and a polarizer protecting film or films (generally about 1 to about 500 μm in thickness) formed on one or both sides of the polarizer with or without an adhesive. The first optical film laminate 11 may further include any other film such as a retardation film (generally 10 to 200 μm in thickness), a viewing angle compensation film, a brightness enhancement film, or a surface protecting film. The thickness of the optical film laminate is typically in the range of 10 μm to 500 μm. The pressure-sensitive adhesive interposed between the polarizing film and the carrier film may be of any type such as an acryl-based pressure-sensitive adhesive, a silicone pressure-sensitive adhesive, or a urethane pressure-sensitive adhesive. For example, the thickness of the pressure-sensitive adhesive layer is preferably in the range of 10 to 50 μm. The peel strength between the pressure-sensitive adhesive and the carrier film is typically, but not limited to, 0.15 (N/50 mm sample width). The peel strength may be measured according to JIS Z 0237.

For example, the carrier film to be used may be a known conventional film such as a plastic film (e.g., a polyethylene terephthalate film or a polyolefin film). According to conventional techniques, any appropriate film such as a film coated with an appropriate release agent such as a silicone, long-chain alkyl or fluoride release agent, or molybdenum sulfide may also be used as needed.

(Liquid Crystal Display Device)

The liquid crystal display device includes a liquid crystal panel and a sheet piece or pieces of polarizing film provided on one or both sides of the liquid crystal panel, into which a driving circuit is incorporated as needed. Any type of liquid crystal panel such as a vertical alignment (VA) or in-plane switching (IPS) type liquid crystal panel may be used. The liquid crystal panel 4 shown in FIG. 3 has a structure including a pair of substrates (first and second substrates 41 and 42) opposed to each other and a liquid crystal layer sealed in between the substrates.

(Embodiment 1)

The system according to this embodiment for continuously manufacturing a liquid crystal display device includes: carrier film feeding means for feeding a carrier film on which sheet pieces of polarizing film are formed with a pressure-sensitive adhesive interposed therebetween; peeling means for peeling off a sheet piece of the polarizing film together with the pressure-sensitive adhesive from the carrier film by inwardly folding back the carrier film at its front end, wherein the carrier film is fed by the carrier film feeding means; take-up means for taking up the carrier film from which the sheet piece is peeled off by the peeling means; bonding means for bonding the sheet piece, which is peeled off from the carrier film by the peeling means, to a liquid crystal panel with the pressure-sensitive adhesive interposed therebetween while feeding the liquid crystal panel so that a liquid crystal display device is formed; and velocity control means for controlling the feed velocity of the take-up means and the feed velocity of the bonding means.

Figure 4:
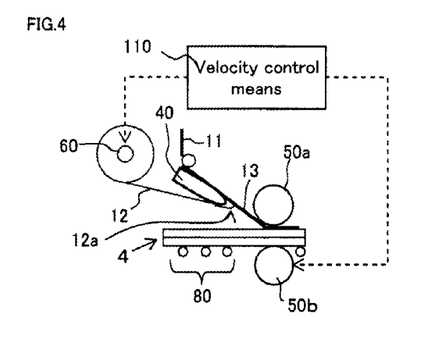
FIG. 4 is a schematic diagram showing an example of the system for continuously manufacturing a liquid crystal display device.
Figure 5:
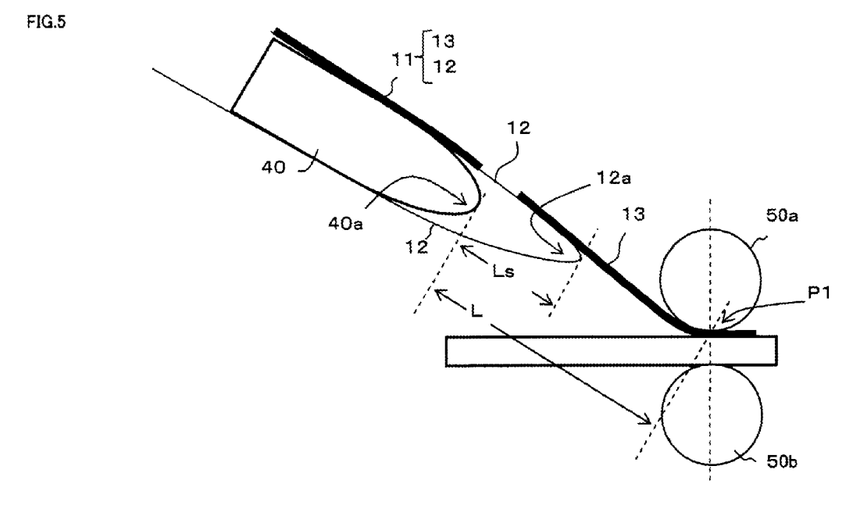
FIG. 5 is a schematic diagram showing an example of the system for continuously manufacturing a liquid crystal display device.

The velocity control means controls the feed velocity of the take-up means and the feed velocity of the bonding means in such a manner that: the bonding velocity (Vh(t)) in the bonding process and the carrier film feed velocity (Vs(t)) at which the carrier film is peeled off by the peeling means are set so that the bonding velocity (Vh(t)) is higher than the carrier film feed velocity (Vs(t)) (Vh(t)>Vs(t)) during a period from the start of the process of bonding the sheet piece by the bonding means to the end of the bonding and that slack formed in the sheet piece being subjected to the bonding is eliminated between the front end of the peeling means and the position in which the bonding is performed by the bonding means; and that during a period from the start of the bonding process to the end of the bonding, the distance (L) between the front end of the peeling means and the position in which the bonding is performed by the bonding means is longer than the distance (Ls) between the front end of the peeling means and a bent part at which the carrier film is folded back. Hereinafter, the system and method according to this embodiment for continuously manufacturing a liquid crystal display device are more specifically described with reference to FIGS. 3 to 5, but this embodiment is not intended to limit the scope of the invention.

The system for continuously manufacturing a liquid crystal display device includes first carrier film feeding means 101, first liquid crystal panel feeding means 102, first bonding means 103 (including a first bonding roller 50a and a first driving roller 50b), second liquid crystal panel feeding means 104, second carrier film feeding means, second bonding means (including a second bonding roller and a second driving roller), and liquid crystal display device feeding means. In this embodiment, a sheet piece of polarizing film is bonded to a liquid crystal panel from the upper side, and then after the liquid crystal panel with the sheet piece bonded thereto is turned over (upside down and optionally turned by 90°), another sheet piece of polarizing film is bonded to the liquid crystal panel from the upper side. Alternatively, a sheet piece of polarizing film may be bonded to the liquid crystal panel from the lower side, and then after the liquid crystal panel is turned over, another sheet piece may be bonded to the liquid crystal panel from the lower side. Alternatively, after a sheet piece is bonded to the liquid crystal panel from the upper side, another sheet piece may be bonded to the liquid crystal panel from the lower side without turning over the liquid crystal panel, or after a sheet piece is bonded to the liquid crystal panel from the lower side, another sheet piece may be bonded to the liquid crystal panel from the upper side without turning over the liquid crystal panel.

(First Liquid Crystal Panel Feeding Means)

The first liquid crystal panel feeding means 102 feeds the liquid crystal panel 4 to the first bonding means 103. In this embodiment, the first liquid crystal panel feeding means 102 includes a feed roller 80, a suction plate, and other components. The liquid crystal panel 4 is fed to the downstream side of the manufacturing line by rotating the feed roller 80 or shifting the suction plate. In the process of bonding a first sheet piece 13, the first liquid crystal panel feeding means 102 is controlled by the first velocity control means 110 described below and feeds the liquid crystal panel 4 to the bonding unit of the bonding means.

(First Carrier Film Feeding Means)

The first carrier film feeding means 101 draws the first optical film laminate 11 from the first continuous roll 1, cuts the first polarizing film and the pressure-sensitive adhesive at predetermined intervals to form a sheet piece 13 (first sheet piece) of the first polarizing film on the first carrier film 12, peels off the first sheet piece 13 and the pressure-sensitive adhesive from the first carrier film 12 by inwardly folding back the first carrier film 12 at the front end of the first peeling means 40, and feeds the first sheet piece 13 and the pressure-sensitive adhesive to the first bonding means 103. For the operation, the first carrier film feeding means 101 includes first cutting means 20, a first dancer roller 30, first peeling means 40, and first take-up means 60.

The first cutting means 20 holds the first optical film laminate 11 from the first carrier film 12 side by suction means 21 and cuts the first polarizing film and the pressure-sensitive adhesive to form the first sheet piece 13 on the first carrier film 12. For example, the first cutting means 20 may be a cutter, a laser, or the like.

The first dancer roller 30 has the function of maintaining tension on the first carrier film 12. The first carrier film feeding means 101 feeds the first carrier film 12 through the first dancer roller 30. After the first sheet piece 13 being bonded is detached (completely separated) from the first carrier film, the first dancer roller 30 automatically returns the first carrier film 12 to the upstream side from the position in which it protrudes from the front end (peeling point) of the first peeling means 40.

When the first sheet piece 13 is bonded to the liquid crystal panel 4, the first peeling means 40 inwardly folds back the first carrier film 12 at its front end to peel off the first sheet piece 13 and the pressure-sensitive adhesive from the first carrier film 12. In this embodiment, a sharp knife edge is used as a non-limiting example of the front end of the first peeling means 40.

The first take-up means 60 takes up the first carrier film 12 from which the first sheet piece 13 and the pressure-sensitive adhesive have been peeled off. In the process of bonding the first sheet piece 13, the velocity at which the first carrier film 12 is taken up by the first take-up means 60 corresponds to the carrier film feed velocity Vs(t), and the first take-up means 60 is controlled by first velocity control means 110 as described below.

(First Bonding Means)

The first bonding means 103 bonds the first sheet piece 13, which is fed by the first carrier film feeding means 101, to the liquid crystal panel 4 from the upper side with the pressure-sensitive adhesive interposed therebetween, when the liquid crystal panel 4 is fed by the first liquid crystal panel feeding means 102. In this embodiment, the first bonding means 103 includes a first bonding roller 50a and a first driving roller 50b. In the process of bonding the first sheet piece 13, the velocity of the rotation of the first driving roller 50b, which corresponds to the bonding velocity Vh(t), is controlled by the velocity control means 110 described below. It has a mechanism in which as the first driving roller 50b rotates, the first bonding roller 50a is driven accordingly. Such a mechanism is non-limiting, and alternatively, the relationship between the driver and the follower may be reversed in the mechanism, or both may be driving mechanisms.

(First Velocity Control Means)

The first velocity control means 110 synchronously controls the first take-up means 60 and the first driving roller 50b so that the velocity at which the carrier film 12 is taken up (the carrier film feed velocity) and the velocity at which the sheet piece is bonded to the liquid crystal panel 4 are controlled in the process of bonding the first sheet piece 13.

The first velocity control means 110 controls the feed velocity of the take-up means and the feed velocity of the bonding means, respectively (see FIGS. 4 and 5), to satisfy the first condition: the bonding velocity (Vh(t)) and the carrier film feed velocity (Vs(t)) are set so that the bonding velocity (Vh(t)) is higher than the carrier film feed velocity (Vs(t)) (Vh(t)>Vs(t)) and that slack formed in the first sheet piece 13 is eliminated between the bonding position P1 and the front end 40a of the peeling means 40, and to satisfy the second condition: the distance (L) between the front end 40a of the peeling means 40 and the position P1 in which the bonding is performed by the bonding means (50a, 50b) is longer than the distance (Ls) between the front end 40a of the peeling means 40 and a bent part 12a at which the carrier film 12 is folded back.

To control the feed velocity (Vs(t)) of the first carrier film 12, the first velocity control means 110 controls the first take-up means 60 so that the take-up velocity of the first carrier film 12 can be controlled. While controlling the first take-up means 60, the first velocity control means 110 may also control a feed roller (not shown) placed downstream of the first peeling means 40 and upstream of the first take-up means 60 so that the feed velocity (Vs(t)) of the first carrier film 12 can be controlled.

(Second Liquid Crystal Panel Feeding Means)

The second liquid crystal panel feeding means 104 feeds, to the second bonding means, the liquid crystal panel 4 with the first sheet piece 13 bonded thereto by the first bonding means 103. The second liquid crystal panel feeding means 104 includes a turning mechanism (not shown) for horizontally turning by 90° the liquid crystal panel 4 with the first sheet piece 13 bonded thereto and a turn-over mechanism for turning over the liquid crystal panel 4 with the first sheet piece 13 bonded thereto.

Any of various means and apparatuses as described above may be used to bond another sheet piece of the polarizing film to the other side of the liquid crystal panel 4. The second carrier film feeding means may have the same device configuration as the first carrier film feeding means, and the second bonding means may have the same device configuration as the first bonding means. For example, the second dancer roller may have the same device configuration as the first dancer roller 30, the second take-up means may have the same device configuration as the first take-up means 60, and the second bonding roller and the second driving roller may have the same mechanism as the first bonding roller 50a and the first driving roller 50b. The second velocity control means may also have the same function as the first velocity control means 110.

The liquid crystal display device feeding means (not shown) may include a feed roller, a suction plate or any other component for feeding downstream the liquid crystal display device Y formed by the second bonding means. An inspection apparatus for inspecting the liquid crystal display device Y may also be provided at a downstream feed site. The purpose and method of the inspection using the inspection apparatus are not restricted.

(Continuous Manufacturing Method)

The liquid crystal display device manufacturing method according to this embodiment includes: a carrier film feeding step including feeding a carrier film on which sheet pieces of polarizing film are formed with a pressure-sensitive adhesive interposed therebetween; a peeling step including peeling off a sheet piece of the polarizing film together with the pressure-sensitive adhesive from the carrier film by inwardly folding back the carrier film at the front end, wherein the carrier film is fed by the carrier film feeding step; a take-up step including taking up the carrier film from which the sheet piece is peeled off by the peeling step; a bonding step including bonding the sheet piece, which is peeled off from the carrier film by the peeling step, to a liquid crystal panel with the pressure-sensitive adhesive interposed therebetween while feeding the liquid crystal panel so that a liquid crystal display device is formed; and a feed velocity control step including controlling the bonding velocity (Vh(t)) in the bonding process and the carrier film feed velocity (Vs(t)) at which the carrier film is peeled off in the peeling step in such a manner that: the bonding velocity (Vh(t)) and the carrier film feed velocity (Vs(t)) are set so that the bonding velocity (Vh(t)) is higher than the carrier film feed velocity (Vs(t)) (Vh(t)>Vs(t)) during a period from the start of the process of bonding the sheet piece to the end of the bonding and that slack formed in the sheet piece is eliminated between the bonding position and the front end of the peeling means; and that during a period from the start of the bonding process to the end of the bonding, the distance (L) between the bonding position and the front end of the peeling means is longer than the distance (Ls) between the front end of the peeling means and a bent part at which the carrier film is folded back.

(First Bonding Step)

The first bonding step includes bonding a first sheet piece of the first polarizing film, which is drawn and fed from the first continuous roll, to a first substrate of the liquid crystal panel. In this embodiment, the first optical film laminate 11 is drawn from the first continuous roll 1, which is a roll of the first optical film laminate 11 including the first carrier film 12 and the first polarizing film formed on the first carrier film 12. The first polarizing film and the pressure-sensitive adhesive are then cut while the first carrier film 12 is left (uncut), so that a first sheet piece 13 of the first polarizing film is formed on the first carrier film 12. The first carrier film 12 is then inwardly folded back at the front end of the first peeling means 40 and fed so that the first sheet piece 13 and the pressure-sensitive adhesive are peeled off from the first carrier film 12. The first sheet piece 13 peeled off from the first carrier film 12 is then bonded to a first substrate of the liquid crystal panel 4 with the pressure-sensitive adhesive interposed therebetween.

(First Velocity Control Step)

The first velocity control step includes controlling the first take-up means 60 and the bonding means (the driving roller 50b) in such a manner that: the bonding velocity (Vh(t)) in the bonding process and the first carrier film 12 feed velocity (Vs(t)) at which the first carrier film 12 is peeled off in the peeling step are set so that the bonding velocity (Vh(t)) is higher than the first carrier film 12 feed velocity (Vs(t)) (Vh(t)>Vs(t)) during a period from the start of the process of bonding the first sheet piece 13 to the end of the bonding and that slack formed in the first sheet piece 13 is eliminated between the bonding position and the front end of the peeling means 40; and that during a period from the start of the bonding process to the end of the bonding, the distance (L) between the bonding position and the front end of the peeling means 40 is longer than the distance (Ls) between the front end of the peeling means 40 and a bent part at which the first carrier film 12 is folded back.

In the continuous manufacturing method, the carrier film feeding step includes the step of feeding the carrier film in such a manner that tension on the carrier film can be maintained. In this embodiment, the first dancer roller 30 is used to maintain tension on the first carrier film 12.

When the polarizing film is also bonded to the other substrate of the liquid crystal panel 4, the method should further include the step of turning and turning over the liquid crystal panel. The step of turning and turning over includes horizontally turning by 90° the liquid crystal panel 4 with the first polarizing film 14 bonded thereto and turning over the liquid crystal panel 4. Alternatively, the step of turning and turning over may include turning over the liquid crystal panel about a single axis neither parallel to the long side nor to the short side of the liquid crystal panel so that the positional relationship between the long and short sides of the liquid crystal panel can be reversed. The step of bonding a sheet piece of the second polarizing film may be performed in the same manner as the first bonding step, and the second velocity control step may also be performed in the same manner as the first velocity control step.

(Other Embodiments)

In Embodiment 1, the optical film laminate is drawn from the continuous roll and cut at predetermined intervals (by half cutting). In the invention, this feature is non-limiting. Alternatively, for example, the optical film laminate drawn from the continuous roll may be inspected for defects and cut in such a manner that defects are avoided based on the result of the inspection (by so-called skip cutting). Alternatively, defect information previously attached to the optical film laminate may be read out, and the optical film laminate may be cut in such a manner that defects are avoided based on the defect information. The defect information may include markings to indicate the defect positions.

The first and second polarizing films in the first and second continuous rolls may also have previously undergone cutting. Specifically, the first and second continuous rolls to be used may be so-called scored continuous rolls. In this case, the first and second cutting means are unnecessary, so that the tact time can be reduced.

EXAMPLES

In the continuous manufacturing system shown in FIG. 3, sheet pieces of polarizing film (VEG1724DU manufactured by NITTO DENKO CORPORATION, 400×700 mm) were bonded to non-alkali glass liquid crystal panels (manufactured by Corning Incorporated, 405×710 mm) from the long side of the panels, respectively. In the examples and the comparative examples, the bonding velocity Vh(t) and the carrier film feed velocity (the take-up velocity of the take-up means) Vs(t) were each controlled as described below when the bonding was performed.

Figure 6A:
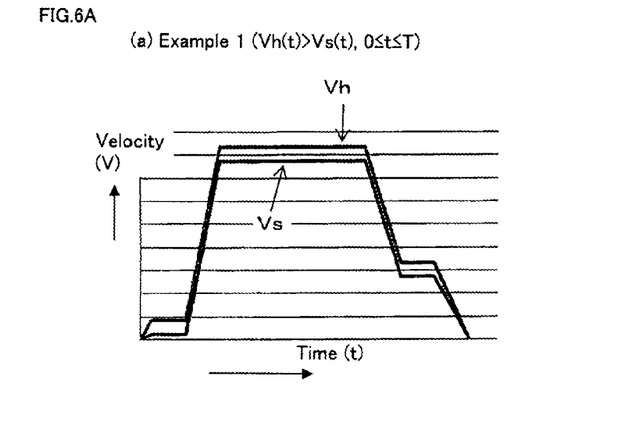
FIGS. 6A to 6F are diagrams showing the velocity conditions in Examples and Comparative Examples, respectively.

In Example 1, Vh(t)>Vs(t) was satisfied in the entire region being subjected to the bonding (Vh(t)>Vs(t) in the range $0 \leq t \leq T$). T represents the time (period) from the start of the bonding to the end of the bonding (hereinafter, the same applies). The velocity conditions in Example 1 are shown in FIG. 6A.

Figure 6B:
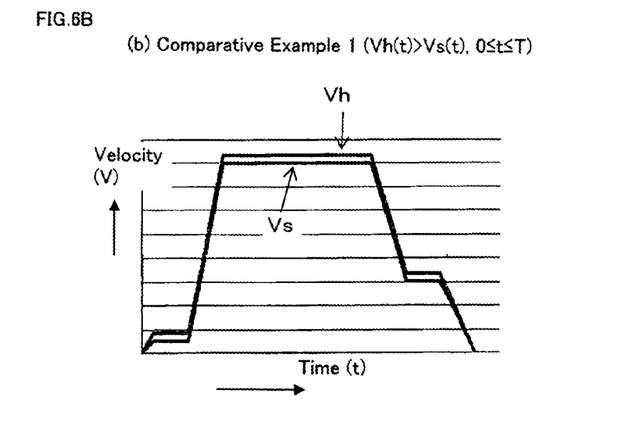

Comparative Example 1 was performed under the conditions: Vh(t)>Vs(t) was satisfied in the entire region being subjected to the bonding, but the difference between Vh(t) and Vs(t) was small so that slack in the sheet piece of polarizing film was not eliminated by the end of the bonding. The velocity conditions in Comparative Example 1 are shown in FIG. 6B.

Figure 6C:
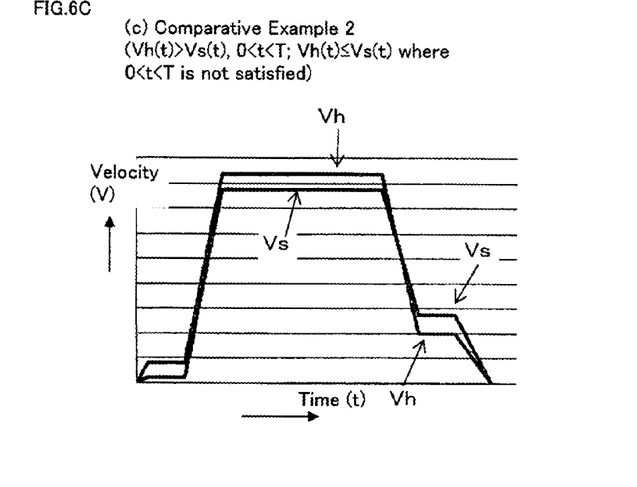

Comparative Example 2 was performed under the conditions: Vh(t)≦Vs(t) was satisfied in a certain region being subjected to the bonding, and in the other region, the difference between Vh(t) and Vs(t) (Vh(t)>Vs(t)) was small so that slack in the sheet piece of polarizing film was not eliminated by the end of the bonding (Vh(t)>Vs(t) in the range 0<t<T, Vh(t)≦Vs(t) where 0<t<T was not satisfied). The velocity conditions in Comparative Example 2 are shown in FIG. 6C.

Figure 6D:
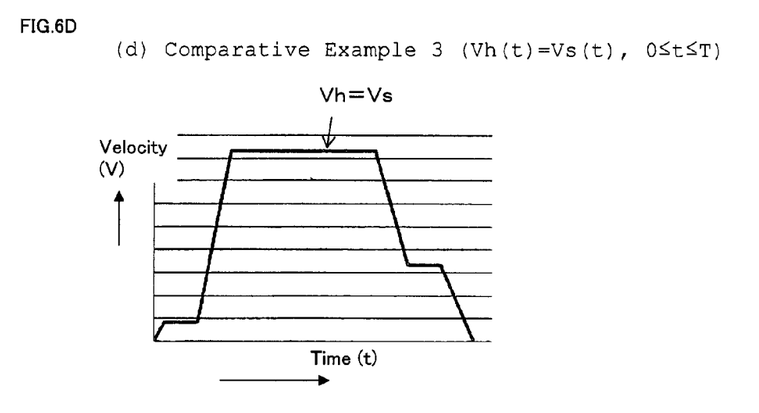

In Comparative Example 3, Vh(t)=Vs(t) was satisfied in the entire region being subjected to the bonding (Vh(t)=Vs(t) in the range 0≦t≦T). The velocity conditions in Comparative Example 3 are shown in FIG. 6D.

Figure 6E:
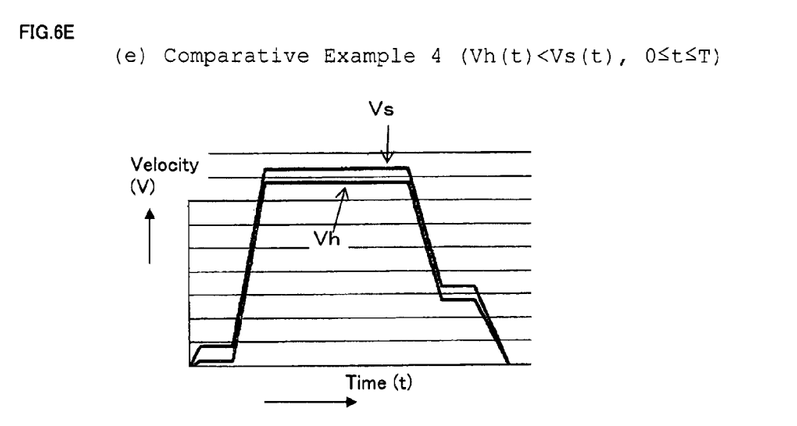

In Comparative Example 4, Vh(t)<Vs(t) was satisfied in the entire region being subjected the bonding (Vh(t)<Vs(t) in the range 0≦t≦T). The velocity conditions in Comparative Example 4 are shown in FIG. 6E.

Figure 6F:
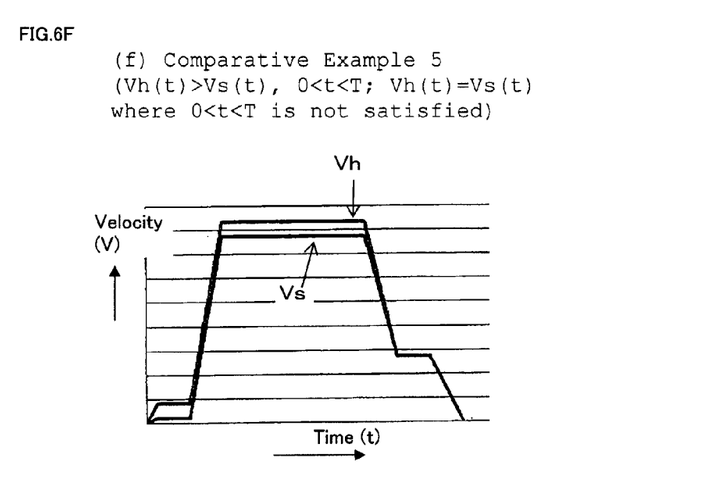

Comparative Example 5 was performed under the conditions: Vh(t)>Vs(t) was satisfied in a certain region being subjected to the bonding, Vh(t)=Vs(t) was satisfied in the other region, and slack in the sheet piece of polarizing film was not eliminated by the end of the bonding (Vh(t)>Vs(t) in the range 0<t<T, Vh(t)=Vs(t) where 0<t<T was not satisfied). The velocity conditions in Comparative Example 5 are shown in FIG. 6F.

(Evaluation Method)

(1) At the end of the bonding, the presence or absence of slack in the polarizing film or swinging of the polarizing film was evaluated by visual inspection.

(2) After the bonding, the presence or absence of bubbles between the sheet piece of polarizing film and the liquid crystal panel was evaluated by visual inspection, and the rate of occurrence of bubbles was calculated.

(3) After the bonding, the presence or absence of retardation unevenness was evaluated by visual inspection, and the rate of occurrence of retardation unevenness was calculated. In each evaluation process, the sample number (N) was 100. The results of the evaluation are shown in Table 1.

TABLE 1

|  | Velocity at start of bonding [mm/second] | | Maximum velocity during bonding [mm/second] | | Velocity at end of bonding [mm/second] | | Presence or absence of slack or swinging | Rate of occurrence of bubbles (%) | Rate of occurrence of retardation unevenness (%) | Yield (%) |
| --- | --- | --- | --- | --- | --- | --- | --- | --- | --- | --- |
|  | Vh | Vs | Vh | Vs | Vh | Vs |  |  |  |  |
| Example 1 | 41.7 | 11.7 | 416.7 | 386.7 | 166.7 | 136.7 | Absent | 0 | 0 | 100 |
| Comparative Example 1 | 41.7 | 25 | 416.7 | 400 | 166.7 | 150.0 | Present | 15 | 0 | 85 |
| Comparative Example 2 | 41.7 | 11.7 | 416.7 | 386.7 | 100 | 136.7 | Present | 31 | 0 | 69 |
| Comparative Example 3 | 41.7 | 41.7 | 416.7 | 416.7 | 166.7 | 166.7 | Present | 52 | 46 | 2 |
| Comparative Example 4 | 11.7 | 41.7 | 386.7 | 416.7 | 136.7 | 166.7 | Present | 79 | 0 | 21 |
| Comparative Example 5 | 41.7 | 11.7 | 416.7 | 386.7 | 136.7 | 136.7 | Present | 22 | 15 | 63 |

As is evident from the results in Table 1, under the conditions of Example 1, slack in the sheet piece or swinging of the sheet piece was successfully eliminated, so that the occurrence of defects such as bubbles and retardation unevenness was successfully prevented. In contrast, under the conditions of any one of Comparative Examples 1 to 5, slack or swinging occurred in the sheet piece so that bubble defects were produced, and under the conditions of Comparative Example 3 or 5, retardation unevenness defects were also produced.

What is claimed is:

1. A system for continuously manufacturing a liquid crystal display device, comprising:
   carrier film feeding means for feeding a carrier film on which sheet pieces of polarizing film are formed with a pressure-sensitive adhesive interposed therebetween;
   peeling means for peeling off a sheet piece of the polarizing film together with the pressure-sensitive adhesive from the carrier film by inwardly folding back the carrier film at its front end, wherein the carrier film is fed by the carrier film feeding means;
   take-up roller configured to roll-up the carrier film from which the sheet piece is peeled off by the peeling means;
   bonding rollers configured to bond the sheet piece, which is peeled off from the carrier film by the peeling means, to a liquid crystal panel with the pressure-sensitive adhesive interposed therebetween while feeding the liquid crystal panel so that a liquid crystal display device is formed; and processor configured to control a feed velocity of the take-up roller a feed velocity of the bonding rollers in such a manner that:

a bonding velocity in a bonding process and a carrier film feed velocity at which the carrier film is peeled off by the peeling means are set so that the bonding velocity is higher than the carrier film feed velocity during a period from a start of the process of bonding the sheet piece by the bonding rollers to the end of the bonding;

slack formed in the sheet piece subjected to the bonding process is eliminated between a front end of the peeling means and a position in which the bonding is performed by the bonding rollers; and during a period from the start of the bonding process to the end of the bonding, the distance between the front end of the peeling means and the position in which the bonding is performed by the bonding rollers is longer than a distance between the front end of the peeling means and a bent part at which the carrier film is folded back and the bonding velocity by the bonding rollers is higher than the carrier film feed velocity by the take-up roller.

2. A method for continuously manufacturing a liquid crystal display device, comprising:

a carrier film feeding step comprising feeding a carrier film on which sheet pieces of polarizing film are formed with a pressure-sensitive adhesive interposed therebetween;

a peeling step comprising peeling off a sheet piece of the polarizing film together with the pressure-sensitive adhesive from the carrier film by inwardly folding back the carrier film at a front end, wherein the carrier film is fed by the carrier film feeding step;

a take-up step comprising taking up the carrier film from which the sheet piece is peeled off by the peeling step;

a bonding step comprising bonding the sheet piece, which is peeled off from the carrier film by the peeling step, to a liquid crystal panel with the pressure-sensitive adhesive interposed therebetween while feeding the liquid crystal panel so that a liquid crystal display device is formed; and a velocity control step comprising controlling a bonding velocity ($Vh(t)$) in the bonding process and a carrier film feed velocity ($Vs(t)$) at which the carrier film is peeled off in the peeling step in such a manner that: the bonding velocity ($Vh(t)$) and the carrier film feed velocity ($Vs(t)$) are set so that the bonding velocity ($Vh(t)$) is higher than the carrier film feed velocity ($Vs(t)$) ($Vh(t)>Vs(t)$) during a period from the start of the process of bonding the sheet piece to the end of the bonding and that slack formed in the sheet piece is eliminated between the bonding position and a front end of the peeling means; and that during a period from the start of the bonding process to the end of the bonding, the distance ($L$) between the bonding position and the front end of the peeling means is longer than the distance ($Ls$) between the front end of the peeling means and a bent part at which the carrier film is folded back and the bonding velocity ($Vh(t)$) in the bonding process is higher than the carrier film feed velocity ($Vs(t)$) ($Vh(t)>Vs(t)$).

3. A system according to claim 1, wherein the carrier film feeding means include at least a dancer roller and the take-up roller.

4. A system according to claim 1, wherein the peeling means include a sharp knife edge formed at the front end of the peeling means.

* * * * *